US009973251B1

(12) United States Patent
Taira et al.

(10) Patent No.: US 9,973,251 B1
(45) Date of Patent: May 15, 2018

(54) RADIO TRANSMISSION APPARATUS

(71) Applicant: Mitsubishi Electric Corporation, Chiyoda-ku (JP)

(72) Inventors: Akinori Taira, Tokyo (JP); Shigeru Uchida, Tokyo (JP); Hiroki Iura, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days. days.

(21) Appl. No.: 15/566,380

(22) PCT Filed: Aug. 5, 2015

(86) PCT No.: PCT/JP2015/072269
§ 371 (c)(1),
(2) Date: Oct. 13, 2017

(87) PCT Pub. No.: WO2017/022108
PCT Pub. Date: Feb. 9, 2017

(51) Int. Cl.
*H04B 7/04* (2017.01)
*H04B 7/06* (2006.01)
(Continued)

(52) U.S. Cl.
CPC ......... *H04B 7/0626* (2013.01); *H04B 1/0475* (2013.01); *H04B 7/0417* (2013.01);
(Continued)

(58) Field of Classification Search
CPC .. H04B 7/0417; H04B 7/0465; H04B 7/0626; H04B 7/0634; H04B 1/0475; H04L 27/2615; H04L 27/2646
See application file for complete search history.

(56) References Cited

U.S. PATENT DOCUMENTS

2005/0130694 A1   6/2005   Medvedev et al.
2008/0207143 A1   8/2008   Skarby et al.
(Continued)

FOREIGN PATENT DOCUMENTS

JP         4401784 B2      1/2010
JP       2010-520675 A     6/2010
(Continued)

OTHER PUBLICATIONS

International Search Report issued Oct. 6, 2015 in PCT/JP2015/072269 filed Aug. 5, 2015.
(Continued)

*Primary Examiner* — David B. Lugo
(74) *Attorney, Agent, or Firm* — Oblon, McClelland, Maier & Neustadt, L.L.P.

(57) ABSTRACT

A radio transmission apparatus includes a plurality of antennas each having an amplifier, a transmission signal generation unit (modulation units, S/P units, and FFT units) which generates a signal to be transmitted to a terminal via the antennas, and a weighting processing unit (a precoder unit, a maximum power calculation unit, and multipliers) which executes a weighting process on a signal to be transmitted to the terminal, which has been generated by the transmission signal generation unit, based on channel state information between the radio transmission apparatus and the terminal and an output limit value of the amplifier.

8 Claims, 6 Drawing Sheets

(51) Int. Cl.
  *H04B 1/04* (2006.01)
  *H04L 27/26* (2006.01)
  *H04B 7/0417* (2017.01)

(52) U.S. Cl.
  CPC ......... *H04B 7/0465* (2013.01); *H04B 7/0634* (2013.01); *H04B 2001/0433* (2013.01); *H04L 27/2615* (2013.01); *H04L 27/2646* (2013.01)

(56) References Cited

U.S. PATENT DOCUMENTS

| | | | | |
|---|---|---|---|---|
| 2009/0280855 | A1* | 11/2009 | Ohwatari | H04B 7/0417 455/522 |
| 2011/0002414 | A1 | 1/2011 | Coldrey et al. | |
| 2011/0105174 | A1 | 5/2011 | Pelletier et al. | |
| 2015/0326293 | A1* | 11/2015 | Lee | H04B 7/0465 370/329 |
| 2017/0272134 | A1* | 9/2017 | Yuan | H04B 7/0452 |
| 2017/0294943 | A1* | 10/2017 | Shen | H04B 7/0413 |

FOREIGN PATENT DOCUMENTS

| | | |
|---|---|---|
| JP | 2011-514752 A | 5/2011 |
| JP | 2013-507071 A | 2/2013 |
| WO | WO 03/071711 A2 | 8/2003 |
| WO | WO 2008/105701 A1 | 9/2008 |
| WO | WO 2009/106090 A1 | 9/2009 |
| WO | WO 2011/041719 A2 | 4/2011 |

OTHER PUBLICATIONS

Tomoya Kageyama, et al., "Performance Evaluation of OFDM-SDMA Systems using Adaptive Peak Cancellation under Restriction of Out-of-band Radiation and In-band Distortion" The Institute of Electronics, Information and Communication Engineers, IEICE Technical Report, RCS2015-1, 2015, 10 Pages (with partial English language translation).

Shoya Takebuchi, et al., "A study on application of OFDM clipping & filtering employing transmit power control to MU-MIMO systems" The Institute of Electronics, Information and Communication Engineers, IEICE Technical Report, RCS2013-311, 2014, 10 Pages (with partial English language translation).

* cited by examiner

RADIO TRANSMISSION APPARATUS

FIELD

The present invention relates to a radio transmission apparatus which spatially multiplex-trans data using a plurality of antennas.

BACKGROUND

In order to transmit large volume data at limited frequencies, there has been advanced development of multiple input multiple output (MIMO) system in which spatial multiplex transmission is performed using a plurality of transmitting and receiving antennas. In recent years, with the aim of further improving frequency utilization efficiency, use of higher frequencies and multi-element configuration of antenna elements have been promoted, and it is expected that the number of spatially multiplexed objects will continue to increase in the future.

In a radio transmission apparatus, a high power amplifier (HPA) for emitting a signal from an antenna is necessary. A multicarrier scheme such as orthogonal frequency division multiplexing (OFDM) is used as a wireless transmission system suitable for high volume transmission, but this scheme is known to have a large peak to average power ratio (PAPR). In order to accurately transmit a signal with a large PAPR, the HPA is required to have precise linearity, and there is concern that the cost will increase. When combining the multicarrier scheme and the MIMO system, it is necessary to take account of a larger PAPR, so the above-mentioned linearity problem becomes more serious.

As a technique for dealing with a large PAPR, for example, in Non Patent Literature 1, a PAPR is minimized by applying a time filter to an instantaneous value of a waveform with a large time fluctuation thereby to mitigate an influence thereof on an amplifier. In Non Patent Literature 2, a technique is disclosed in which a multi user (MU)-MIMO system is assumed, and with the use of a carrier and noise power ratio (CNR) fed back from a receiving side, a transmitting side adaptively controls backoff based on a predicted carrier and interference noise power ratio (CINR) calculated from backoff of an HPA.

CITATION LIST

Non Patent Literature

Non Patent Literature 1: Kageyama, Muta, HarisGACA-NIN, Furukawa, "Performance Evaluation of OFDM-SDMA Systems using Adaptive Peak Cancellation under Restriction of Out-of-band Radiation and In-band Distortion," THE INSTITUTE OF ELECTRONICS, INFORMATION AND COMMUNICATION ENGINEERS, IEICE Technical Report, RCS2015-1

Non Patent Literature 2: Takebuchi, Maruko, Osada, Maehara, "A study on application of OFDM clipping & filtering employing transmit power control to MU-MIMO systems," THE INSTITUTE OF ELECTRONICS, INFORMATION AND COMMUNICATION ENGINEERS, IEICE Technical Report, RCS2013-311

SUMMARY

Technical Problem

As the number of antenna elements increases and the number of spatially multiplexed objects increases, the above-mentioned problem of the PAPR becomes more serious. In addition, as the number of antenna elements increases, it becomes difficult to implement an analog to digital converter (ADC) and a digital to analog converter (DAC) for each of the elements from the viewpoints of cost and size. In order to deal with this difficulty, a technique is adopted, in which an array antenna is constructed of an analog circuit to achieve cost reduction. However, in this technique, it is necessary to perform calibration between the elements in order to emit a beam accurately from the antenna. Furthermore, in a time division duplex (TDD) type system which forms a beam using symmetry of a transmission path, it is necessary to perform calibration between a reception circuit on a signal receiving side and a transmission circuit including an amplifier on a signal transmitting side, thus leading to difficulty of adjusting the circuits. In particular, there is a variation in frequency characteristics in antenna elements for an inexpensive configuration, and so it is necessary to change a transmission weight for spatial multiplex for each frequency. However, in the technique of Non Patent Literature 2, it is difficult to predict a CINR with frequency characteristics taken into account. In short, it is difficult to apply the technique of Non Patent Literature 2 when there is a variation in frequency characteristics in antenna elements.

In addition, as the number of multiplexed users increases, rapid feedback from each user becomes difficult, and fading fluctuation of a transmission path in the same section becomes noticeable in a high frequency band, so that more frequent feedback is required to acquire an accurate reception CNR, which is a factor responsible for pressuring an uplink bandwidth.

The present invention has been made in view of the above circumstances, and it is an object of the present invention to provide a radio transmission apparatus capable of controlling input backoff of a high power amplifier.

Solution to Problem

In order to solve the above-mentioned problems and to achieve the object, a radio transmission apparatus according to the present invention includes a plurality of antennas each having an amplifier, and a transmission signal generation unit to generate a signal to be transmitted to a terminal via the antenna. In addition, the radio transmission apparatus has a weighting processing unit to execute a weighting process on a signal to be transmitted to the terminal, which has been generated by the transmission signal generation unit, based on channel state information between the radio transmission apparatus and the terminal and an output limit value of the amplifier.

Advantageous Effects of Invention

The present invention achieves an effect of obtaining a radio transmission apparatus capable of controlling input backoff of a high power amplifier.

DESCRIPTION OF EMBODIMENTS

Hereinafter, a radio transmission apparatus according to an embodiment of the present invention will be described in detail with reference to the drawings. The invention is not necessarily limited to the embodiment.

First Embodiment

Figure 1:
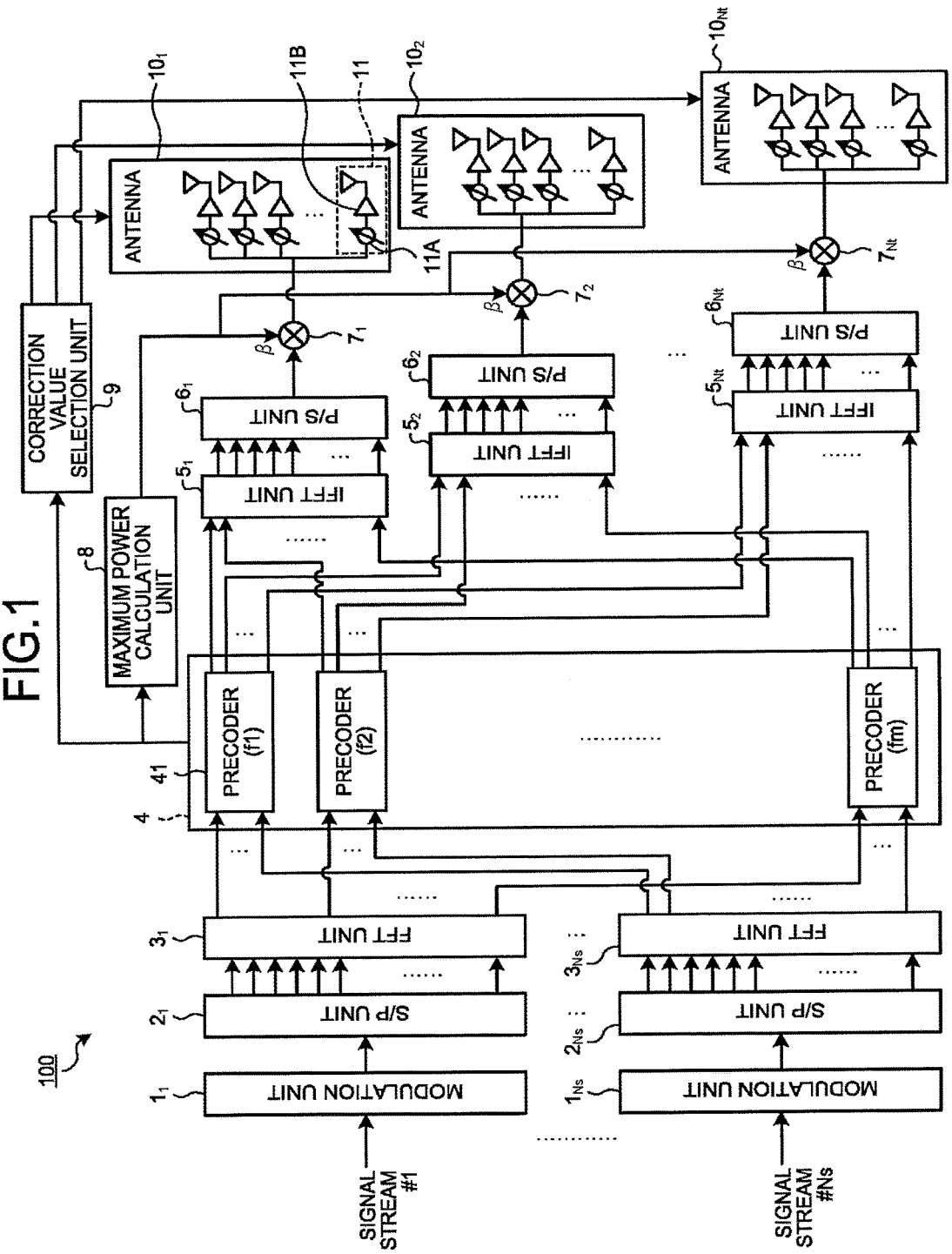
FIG. 1 is a diagram illustrating a configuration example of a radio transmission apparatus according to a first embodiment.

FIG. 1 is a diagram illustrating a configuration example of a radio transmission apparatus according to a first embodiment of the present invention. The radio transmission apparatus 100 illustrated in FIG. 1 constitutes, for example, a base station of a mobile communication system, and provides a function of forming one or more beams, spatially multiplexing signals directed to respective users, and simultaneously transmitting the resultant multiplexed signals to the users, that is, mobile terminals (hereinafter referred to as terminals) (including multi-user PIMP and single-user PIMP). Hereinafter, an example of the case where the radio transmission apparatus constitutes the base station for the mobile communication system will be described.

As illustrated in FIG. 1, the radio transmission apparatus 100 according to the present embodiment includes modulation units $1_1$ to $1_{Ns}$, serial-to-parallel conversion units (S/P units) $2_1$ to $2_{Ns}$, fast fourier transform (FFT) units $3_1$ to $3_{Ns}$, a precoder unit 4, inverse fast fourier transform (IFFT) units $5_1$ to $5_{Nt}$, parallel-to-serial conversion units (P/S units) $6_1$, multipliers $7_1$ to $7_{Nt}$, a maximum power calculation unit 8, a correction value selection unit 9, and antennas $10_1$ to $10_{Nt}$. Ns denotes the number of signal streams to be spatially multiplex-transmitted. The modulation units $1_1$ to $1_{Ns}$, the serial-to-parallel conversion units $2_1$ to $2_{Ns}$, and the FFT units $3_1$ to $3_{Ns}$ operate as a transmission signal generation unit. The precoder unit 4, the maximum power calculation unit 8, and the multipliers $7_1$ to $7_{Nt}$ operate as a weighting processing unit. The maximum power calculation unit 8 and the multipliers $7_1$ to $7_{Nt}$ constitute a power correction unit of the weighting processing unit.

In addition, the precoder unit 4 is constituted by a plurality of precoders 41, and the antennas 101 to 10Nt that are array antennas are each constituted by a plurality of array elements 11. Each array element 11 includes a phase shifter 11A and a high power amplifier (HPA) 11B, and can adjust a phase and an amplitude of a signal to be transmitted. The HPAs 11B are amplifiers included in the antennas $10_1$ to $10_{Nt}$.

Although FIG. 1 illustrates a configuration example of a radio transmission apparatus for a multicarrier signal, the present invention is not limited to a case of transmitting a multicarrier signal, and can also be applied to a case of transmitting a single carrier signal.

Hereinafter, an operation of each unit of the radio transmission apparatus 100 of the present embodiment will be described.

When signal streams #1 to #Ns that are signals to be transmitted to the users are inputted, the modulation units $1_1$ to $1_N$, modulate the signal streams #1 to #Ns and output the resultant signal streams to the serial-to-parallel conversion units $2_1$ to $2_{Ns}$. The modulation units $1_1$ to $1_N$, modulate the input signal streams #1 to #Ns in conformity to a determined modulation scheme such as quadrature phase shift keying (QPSK) or quadrature amplitude modulation (QAM).

The serial-to-parallel conversion unit to $2_N$, perform serial-to-parallel conversion of the input signals from the modulation units $1_1$ to $1_N$, and output the resultant signals to the FET units $3_1$ to $3_{Ns}$.

The FFT units $3_1$ to $3_N$, convert the signals inputted from the serial-to-parallel conversion units $2_1$ to $2_N$, from signals on a time axis to signals on a frequency axis, and output the resultant signals to the precoder unit 4. The signals on a frequency axis outputted from the FET units $3_1$ to $3_N$, are inputted to the corresponding precoders 41 of the precoder unit 4 for each frequency component.

In the precoder unit 4, each precoder 41 performs a weighting process between antennas for spatial multiplex for each of frequency bins fl to fm, that is, for each frequency component, based on channel state information (CSI) between the radio transmission apparatus and each terminal. In the present embodiment, a TDD-type system is assumed, which does not require CSI feedback from a terminal that is on a signal receiving side. That is, based on a known signal transmitted from the terminal, the CSI in an uplink direction is obtained on the side of the radio transmission apparatus 100, and with the use thereof as the CSI in a downlink direction, a weighting process between antennas is performed. The CSI is calculated, for example, by a radio receiving apparatus whose illustration is omitted in FIG. 1, that is, by a radio reception apparatus constituting the base station together with the radio transmission apparatus 100, and the calculated CSI is inputted to the precoder unit 4. Since a method of calculating CSI is widely known, description thereof is omitted.

Figure 2:
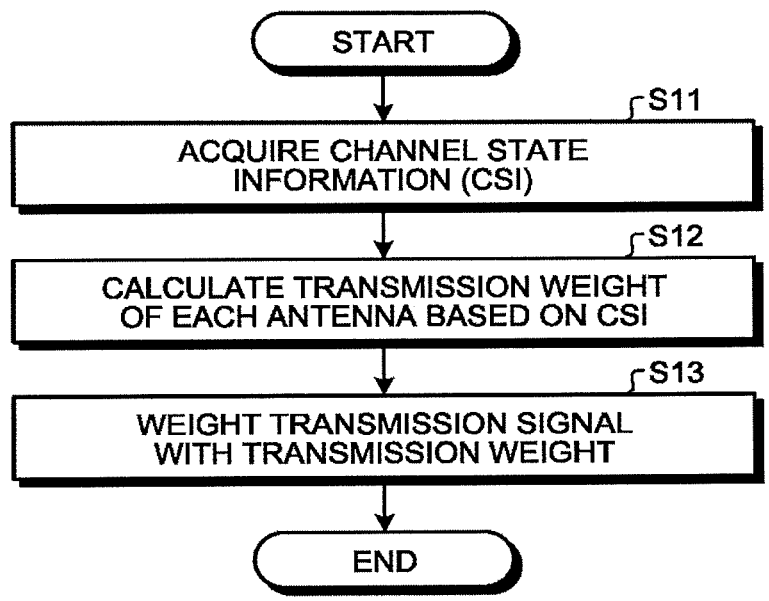
FIG. 2 is a flowchart illustrating an operation example of a precoder unit of the first embodiment.

FIG. 2 is a flowchart illustrating an operation example of the precoder unit 4. The precoder unit 4 first acquires CSI (Step S11), and then calculates a transmission weight of each antenna based on the acquired CSI (Step 312) In Step S12, the precoder unit 4 calculates the transmission weight of each antenna for each signal stream. The precoder unit 4 calculates the transmission weight by, for example, a publicly known block diagonalization (BD) method. In this BD method, a transmission weight for each antenna is calculated so that a beam is formed such that transmission of a signal stream addressed to one terminal does not interfere with other terminals. A method of calculating a transmission weight is not limited to the BD method. The transmission weight may be calculated in other publicly known methods. The precoder unit 4 next weights a transmission signal using the calculated transmission weight (Step S13). Specifically, each precoder 41 multiplies the transmission signal, which is a signal inputted frog each of the FFT units $3_1$ to $3_{Ns}$, by the transmission weight calculated in Step S12, thereby performing the weighting.

The transmission signals obtained after the weighting in the precoder unit 4 are outputted to the IFFT units $5_1$ to $5_{Nt}$ in accordance with a destination terminal. The IFFT units $5_1$ to $5_{Nt}$ convert the transmission signals inputted from the precoder unit 4 into signals on a time axis and output the resultant signals to the parallel-to-serial conversion units $6_1$ to $6_{Nt}$.

The parallel-to-serial conversion units $6_1$ to $6_{Nt}$ perform parallel-to-serial conversion of the input signals from the IFFT units $5_1$ to $5_{Nt}$. In general, a guard interval addition process and an up-conversion process are subsequently carried out, but since they are not indispensable for realizing the present invention, constituent elements performing these processes are omitted in FIG. 1.

Here, the transmission weight generated by the precoder unit 4 changes variously depending on the CSI between the radio transmission apparatus 100 performing spatial multiplex and a terminal receiving a spatially multiplexed signal. Also, depending on conditions, power concentrates on a limited one of the antennas, and an average power value of a signal transmitted from the limited antenna may become high. As already described, the HPA for amplifying a signal is mounted on the radio transmission apparatus 100, but output of the HPA has a limit, that is, a saturation power value, and for a high power signal, linearity of the signal at the time of amplification cannot be maintained. In addition, in massive-MIMO with a large number of antenna elements, a large amount of CSI feedback is required when a frequency division duplex (FDD) type system is realized. For this reason, in the present embodiment, transmission path estimation using propagation path reversibility of a TDD system is performed so that CSI feedback is not required.

On the other hand, in order to utilize the propagation path reversibility of the IDE, calibration between transmitting and receiving blocks is indispensable. To this end, in the radio transmission apparatus 100 of the present embodiment, a correction value corresponding to an average power value of an input signal for the HPA is selected from a correction table, and a phase and an amplitude of the input signal for the HPA are corrected. Specifically, the correction value selection unit 9 performs a process for selecting a correction value corresponding to the average power value of the input signal from the correction table, and the antennas $10_1$ to $10_{Nt}$ use the correction values selected by the correction value selection unit 9 to correct the phase and the amplitude of the transmission signals. The correction table is a table in which a plurality of average power values of an input signal to the HPA and correction values of a plurality of phases and amplitudes respectively corresponding to the average power values are registered, and the correction table is created at the time of designing the radio transmission apparatus 100 and is stored in advance by the correction value selection unit 9.

Also in a correction function of the correction value selection unit 9 and the antennas $10_1$ to $10_{Nt}$, it is difficult to correct a signal having a certain level of power or more. That is, since there is an allowable maximum power value for achieving spatial multiplex, it is necessary to adjust power of input signals for the antennas $10_1$ to $10_{Nt}$ by means of limiting the magnitude of the transmission weight generated by the precoder unit 4 to a certain value or less, or by the like means. Therefore, the radio transmission apparatus 100 according to the present embodiment includes the maximum power calculation unit 8 and the multipliers $7_1$ to $7_{Nt}$, and is configured to adjust the power of the input signals for the antennas $10_1$ to $10_{Nt}$. The maximum power calculation unit 8 that is a correction value calculation unit determines a power correction value β for adjusting power of the transmission signal, and the multipliers $7_1$ to $7_{Nt}$ multiply the transmission signal by the power correction value β to adjust the power.

Figure 3:
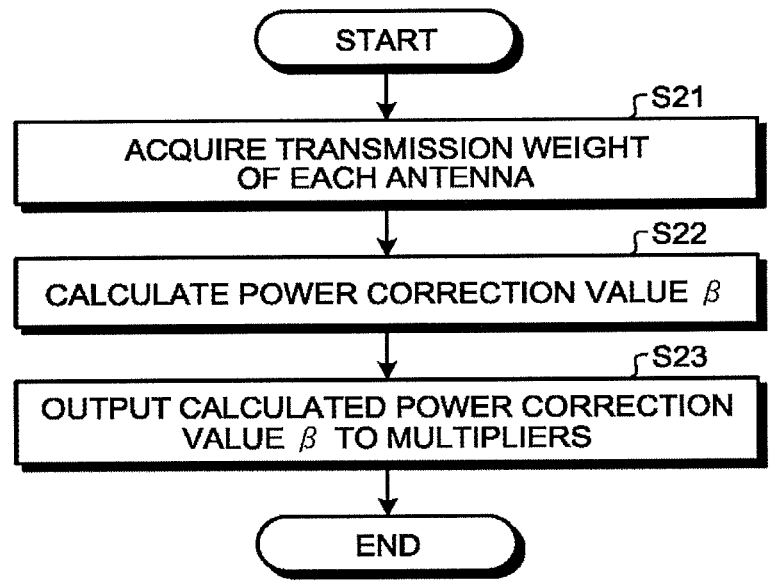
FIG. 3 is a flowchart illustrating an operation example of a maximum power calculation unit of the first embodiment.

FIG. 3 is a flowchart illustrating an operation example of the maximum power calculation unit 8. First, the maximum power calculation unit 8 acquires a transmission weight of each antenna, calculated by the precoder unit 4, from the precoder unit 4 (Step S21). Next, the maximum power calculation unit 8 calculates a power correction value β based on the acquired transmission weight (Step S22).

Now detailed description will be given for an operation in which the maximum power calculation unit 8 calculates the power correction value β in Step S22. In Step S22, the maximum power calculation unit 8 first calculates an average power value for each antenna when signal streams to be transmitted respectively to all users are combined. A transmission weight $w_{k,f}$, where a stream number is k and a frequency bin number is f in the precoder unit 4, is represented by the following formula (1). In the following formula (1), Nt denotes the number of transmission antennas.

[Formula 1]

$$w_{k,f} = \begin{bmatrix} w_{k,f}^1 \\ w_{k,f}^2 \\ \vdots \\ w_{k,f}^{Nt} \end{bmatrix} \quad (1)$$

In the formula (1), elements of a vector are transmission weights of the respective antennas. An average power value $P_m$ (m=1, 2, ..., Nt) for each antenna when signal streams to be transmitted respectively to all users are combined can be obtained according to the following formula (2). In the formula (2), Ns denotes the number of signal streams to be transmitted, and Nf denotes the number of frequency bins.

[Formula 2]

$$P_m = \sum_{k=1}^{Ns} \sum_{f=1}^{Nf} |w_{k,f}^n|^2 \quad (2)$$

Next, the maximum power calculation unit 8 obtains the power correction value β based on the average power value $P_m$ obtained according to the above formula (2). Here, it is assumed that in the maximum power calculation unit 8, a maximum power threshold Th is set in advance, in consideration of nonlinear characteristics of the HPAs provided in the antennas $10_1$ to $10_{Nt}$ and a limit value at which calibration for an array element 11 and a high-frequency circuit whose illustration is omitted in FIG. 1 can be maintained. This maximum power threshold Th is determined, for example, by simulation or the like at the time of designing the radio transmission apparatus 100. The maximum power calculation unit 8 calculates the power correction value β according to the following formula (3) using the average power value $P_m$ of the signals inputted to the antennas $10_m$ (m=1, 2, ..., Nt) and the maximum power threshold Th. In the following formula (3), Pmax denotes the maximum value among the average power values $P_m$ of the signals inputted to the respective antennas, which have been obtained according to the above formula (2).

[Formula 3]

$$P\max = \max_{\forall m} [P_m] \qquad (3)$$

$$\beta = \sqrt{Th/P\max}$$

Returning to the description of FIG. 3, when the maximum power calculation unit A calculates the power correction value β in Step S22, the maximum power calculation unit 8 outputs the calculated power correction value β to the multipliers $7_1$ to $7_{Nt}$ (Step S23).

The multipliers $7_1$ to $7_{Nt}$ multiply the input signals for the antennas $10_1$ to $10_{Nt}$ by the power correction value β calculated by the maximum power calculation unit 8 in Step S22 described above, and thereby the calibration problem can be avoided without disturbing orthogonality among users.

Figure 4:
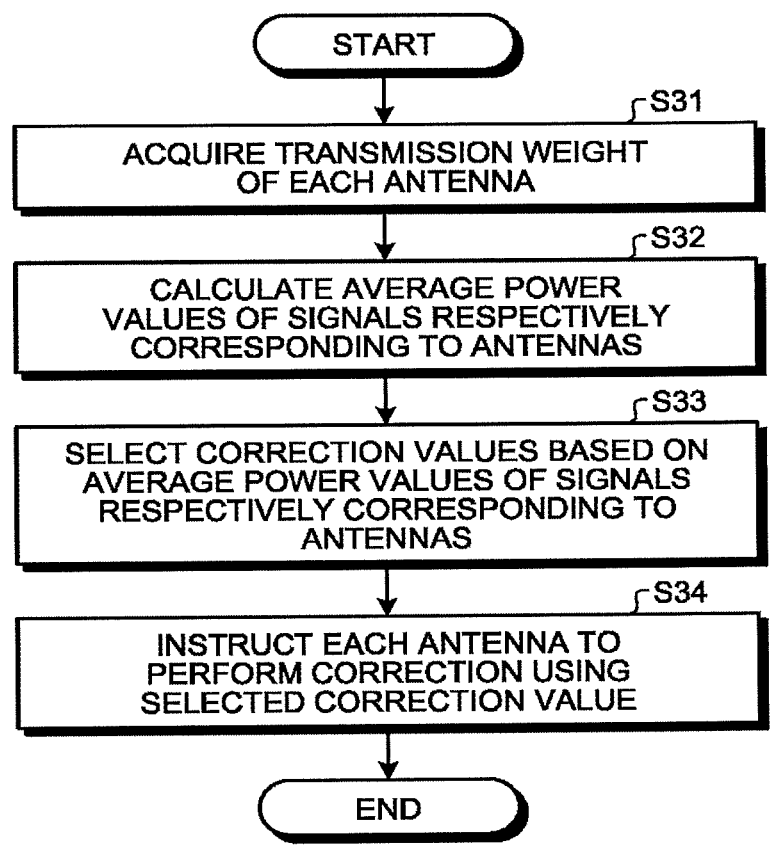
FIG. 4 is a flowchart illustrating an operation example of a correction value selection unit of the first embodiment.

FIG. 4 is a flowchart illustrating an operation example of the correction value selection unit 9. First, the correction value selection unit 9 acquires a transmission weight of each antenna calculated by the precoder unit 4 from the precoder unit 4 (Step 1). Next, the correction value selection unit 9 calculates average power values of signals respectively corresponding to antennas based on the acquired transmission weights (Step S32). That is, the correction value selection unit 9 calculates the average power value $P_1$ (m=1, 2, . . . , Nt) for each antenna when signal streams to be transmitted respectively to all users are combined. The average power value β for each antenna is h same as the average power value $P_m$ calculated when the maximum power calculation unit 8 obtains the power correction value β, and similarly to the maximum power calculation unit 8, the average power value $P_m$ is calculated according to the above formula (2). It should be noted that the correction value selection unit 9 may acquire the average power value $P_m$ for each antenna from the maximum power calculation unit 8 instead of calculating the average power value each antenna based on the transmission weight of each antenna. That is, instead of Steps S31 and S32, the correction value selection unit 9 may execute a step of acquiring the average power value $P_m$ for each antenna from the maximum power calculation unit 8.

After calculating the average power value $P_m$ for each antenna, the correction value selection unit 9 then selects a correction value to be used in a correction process for each of the antennas $10_1$ to $10_{Nt}$ from the correction table, based on the average power value $P_m$ each antenna (Step S33). That is, the correction value selection unit. 9 selects, for each of the antennas $10_1$ to $10_{Nt}$, correction values respectively corresponding to the average power values $P_1$ to $P_{Nt}$ for the respective antennas $10_1$ to $10_{Nt}$.

Upon selecting the correction value to be used in the correction process for each of the antennas $10_1$ to $10_{Nt}$, the correction value selection unit 9 then outputs the selected correction values to the corresponding antennas $10_1$ to $10_{Nt}$, and instructs the antennas to correct amplitudes and phases of signals inputted from the multipliers $7_1$ to $7_{Nt}$ (Step S34).

When signals are inputted from the multipliers $7_1$ to $7_{Nt}$, the antennas $10_1$ to $10_{Nt}$ correct the amplitudes and the phases thereof using the correction values received from the correction value selection unit 9, and emit the resultant signals in a space. In each array element 11 of the antennas $10_1$ to $10_{Nt}$, the phase shifter 11A corrects a phase of the signal, and the HPA 11B corrects an amplitude of the signal, that is, amplifies the signal.

In the present embodiment, the multipliers $7_1$ to $7_{Nt}$ are provided between the parallel-to-serial conversion units $6_1$ to $6_{Nt}$ and the antennas $10_1$ to $10_{Nt}$, the input signals for the antennas $10_1$ to $10_{Nt}$ are multiplied by the power correction value thereby to perform the power adjustment. However, the position where the multipliers $7_1$ to $7_{Nt}$ are provided may be anywhere between the precoder unit 4 and the antennas $10_1$ to $10_{Nt}$.

As described above, the radio transmission apparatus 100 according to the present embodiment corrects the power of the input signal for each antenna to be equal to or less than a prescribed threshold based on the transmission weight of each antenna, and corrects, for each antenna, the amplitude and the phase of the signal to be transmitted from each antenna by using the correction value according to the average power value of the input signal for the antenna. As a result, it is possible to control the input backoff of the high power amplifier. In addition, since the input backoff of the high power amplifier can be controlled, it is possible to solve calibration between the transmitting side and the receiving side and calibration between the antennas, which result in a problem for the TDD-type system. Therefore, it is possible to provide a radio transmission apparatus capable of achieving highly accurate user multiplex without requiring CSI feedback from the receiving side of the spatially multiplexed signal.

Although the description has been given for the case where the TDD-type system includes the maximum power calculation unit 8 and the correction value selection unit 9 in the present embodiment, the maximum power calculation unit 8 and the correction value selection unit 9 may be included in an FDD-type system, that is, a system which calculates a transmission weight based on the CSI in a direction from a base station to a terminal (downlink direction), which has been fed back from the terminal. Operations of the maximum power calculation unit 8 and the correction value selection unit 9 in that case are equivalent to those in the present embodiment.

A hardware configuration for realizing the radio transmission apparatus 100 according to the present embodiment will be described. Among the constituent elements of the radio transmission apparatus 100, the modulation units $1_1$ to $1_{Ns}$ can be realized by a modulator, a modem, or the like. The serial-to-parallel conversion units $2_1$ to $2_{Nt}$, the FFT units $3_1$ to $3_{Ns}$, the IFFT units $5_1$ to $5_{Nt}$, the parallel-to-serial conversion units $6_1$ to $6_{Nt}$, and the multipliers $7_1$ to $7_{Nt}$ are realized by an electronic circuit or circuits configured to include various kinds of logic circuits. The antennas $10_1$ to $10_{Nt}$ are realized by an electronic circuit configured to include a phase shifter, an HPA, and the like.

Figure 5:
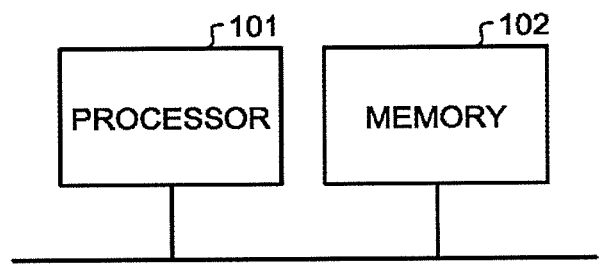
FIG. 5 is a diagram illustrating an example of a hardware configuration for realizing the precoder unit, the maximum power calculation unit, and the correction value selection unit of the first embodiment.

The precoder unit 4, the maximum power calculation unit 8, and the correction value selection unit 9 are realized, for example, by a processor 101 illustrated in FIG. 5 executing a program stored in a memory 102. That is, the pre coder unit 4, the maximum power calculation unit 8, and the correction value selection unit 9 are realized by the processor 101 reading a program for performing operations of the precoder unit 4, the maximum power calculation unit 8, and the correction value selection unit 9 from the memory 102, and executing the program. The processor 101 is a central processing unit (CPU, also referred to as a processing unit, an arithmetic unit, a microprocessor, a microcomputer, a processor, or a digital signal processor (DSP)), system large scale integration (LSI), or the like. The memory 102 may be a non-volatile or volatile semiconductor memory such as a random access memory (RAM), a read only memory (ROM), a flash memory, an erasable programmable read only memory (EPROM), or an electrically erasable programmable read-only memory (EEPROM), a magnetic disk, a flexible disk, an optical disk, a compact disc, a mini disk, a digital versatile disc (DVD), or the like. The memory 102 is used also as a storage area for the maximum power threshold Th to be used by the maximum power calculation unit 8 to obtain the power correction value β, and as a storage area for the correction table to which reference is made by the correction value selection unit 9 to select a correction value to be used in the correction process for the antennas $10_1$ to $10_{Nt}$.

Figure 6:
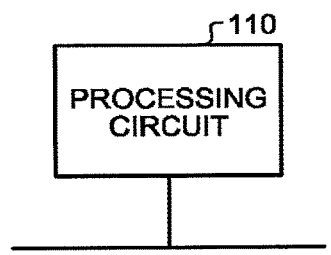
FIG. 6 is a diagram illustrating another example of the hardware configuration for realizing the precoder unit, the maximum power calculation unit, and the correction value selection unit of the first embodiment.

The precoder unit 4, the maximum power calculation unit 8, and the correction value selection unit 9 may be realized by dedicated hardware, or some of them may be realized by dedicated hardware, and the rest thereof may be realized by software, firmware, or a combination of software and firmware. A hardware configuration in the case where these units are realized by dedicated hardware is as illustrated in FIG. 6, for example. That is, the precoder unit 4, the maximum power calculation unit 8 and the correction value selection unit 9 are realized by a processing circuit 110. The processing circuit 110 is an electronic circuit which executes a process of weighting a signal to be transmitted to the terminal, a process of calculating a power correction value for adjusting power of a transmission signal, and a process of selecting a correction value for correcting an input signal for an antenna from the correction table. The processing circuit 110 corresponds to, for example, a single circuit, a composite circuit, a programmed processor, a parallelly programmed processor, an application specific integrated circuit (ASIC), a field programmable gate array (FPGA), or a combination thereof.

Second Embodiment

The radio transmission apparatus according to the first embodiment obtains the power correction value β for adjusting the power of the input signal for each antenna to be equal to or less than the maximum power threshold Th, based on the transmission weight of each antenna, and adjusts the input signal for each antenna using the power correction value β. On the other hand, in a radio transmission apparatus of the present embodiment, power of an input signal for each antenna is limited to or below a maximum power threshold Th by adjusting a transmission weight of each antenna.

Figure 7:
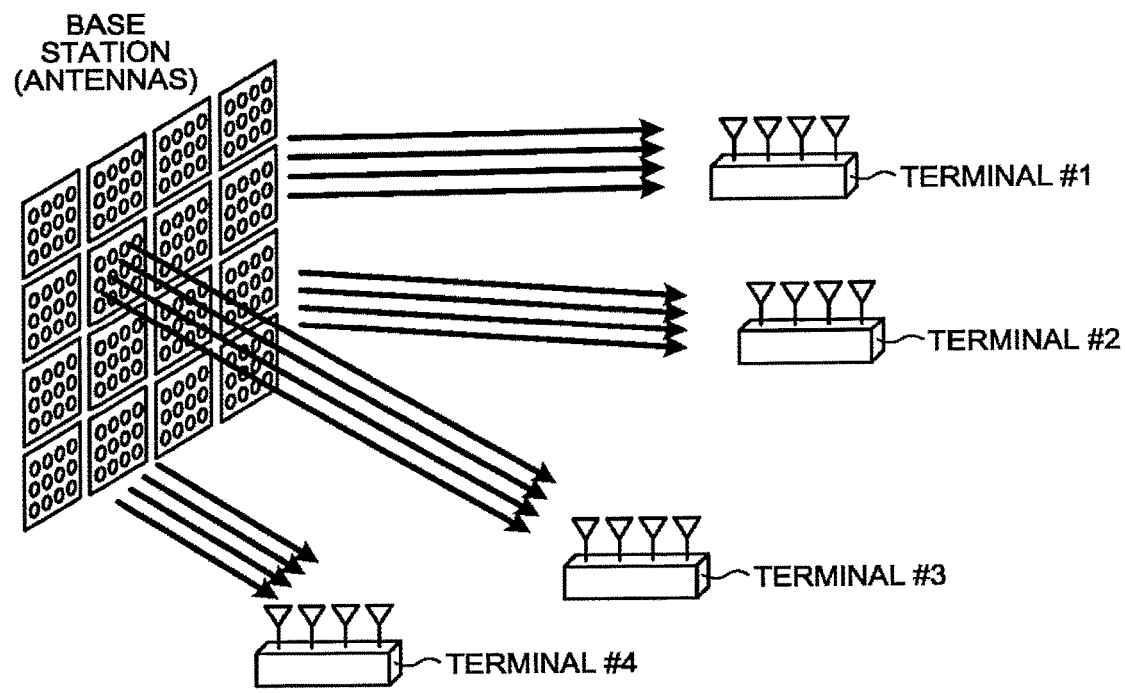
FIG. 7 is a diagram illustrating an example of a radio communication system to which a radio transmission apparatus of a second embodiment is applied.

FIG. 7 is a diagram illustrating an example of a radio communication system to which the radio transmission apparatus according to the second embodiment is applied. FIG. 7 illustrates a configuration example of MU-PING in which four users, that is, terminals #1 to #4, and a base station including the radio transmission apparatus according to the present embodiment perform simultaneous communication. For the base station, only antennas are illustrated. As illustrated in the figure, the base station has 16 antennas, each of the terminals #1 to #4 has four antennas, and 16 streams, in total, are spatially multiplexed and transmitted to the terminals #1 to #4 from the base station. The base station transmits a signal with allocating four streams to one terminal. In that case, it is unnecessary for the base station to perform nulling for the four streams addressed to a specific terminal, and it is only necessary to achieve nulling for the 12 antennas included in the other terminals.

In the case of the configuration illustrated in FIG. 7, for example, when a transmission weight of a stream #m (1≤m≤4) of a user #k (1≤k≤4) that is a terminal #k is v (bold) $_k^m$, a signal weighted by the transmission weight v (bold) $_1^m$ and transmitted to a user #1 is nulled for users #2, #3, and #4. That is, the transmission weight addressed to the user #1 can be arbitrarily selected within a subspace having four basis vectors v (bold) $_1^1$ to v (bold) $_1^4$. In other words, a vector (transmission weight) generated by a linear combination of these four vectors does not give interference to users #2, #3, and #4. In general, the base station calculates the transmission weight so as to achieve eigenmode transmission to the four antennas of each user (terminal), weights the signal for each user accordingly, and transmits the resultant signal. Weighting of signals by transmission weights is performed for each frequency bin, but the notation of a frequency bin number is omitted here. When the number of transmission antennas equipped in the base station is larger than the number of spatially multiplexed objects, a spatial degree of freedom, that is, the number of basis vectors, increases accordingly. The number of spatially multiplexed objects herein corresponds to the number of signal streams addressed to each user, that is, the number of signal streams to be spatially multiplexed.

In the present embodiment, what is assumed is the case where the number of antennas included in the base station is equal to or larger than the number of spatially multiplexed objects of the signal streams to be transmitted to each terminal, as illustrated in FIG. 7, and the radio transmission apparatus limits power of the input signal for each antenna to the maximum power threshold Th or less by adjusting the transmission weight of each antenna.

Various methods are conceivable as method of calculating a transmission weight for limiting the power of an input signal for each antenna to the maximum power threshold Th or less, and an example thereof will be described below.

Figure 8:
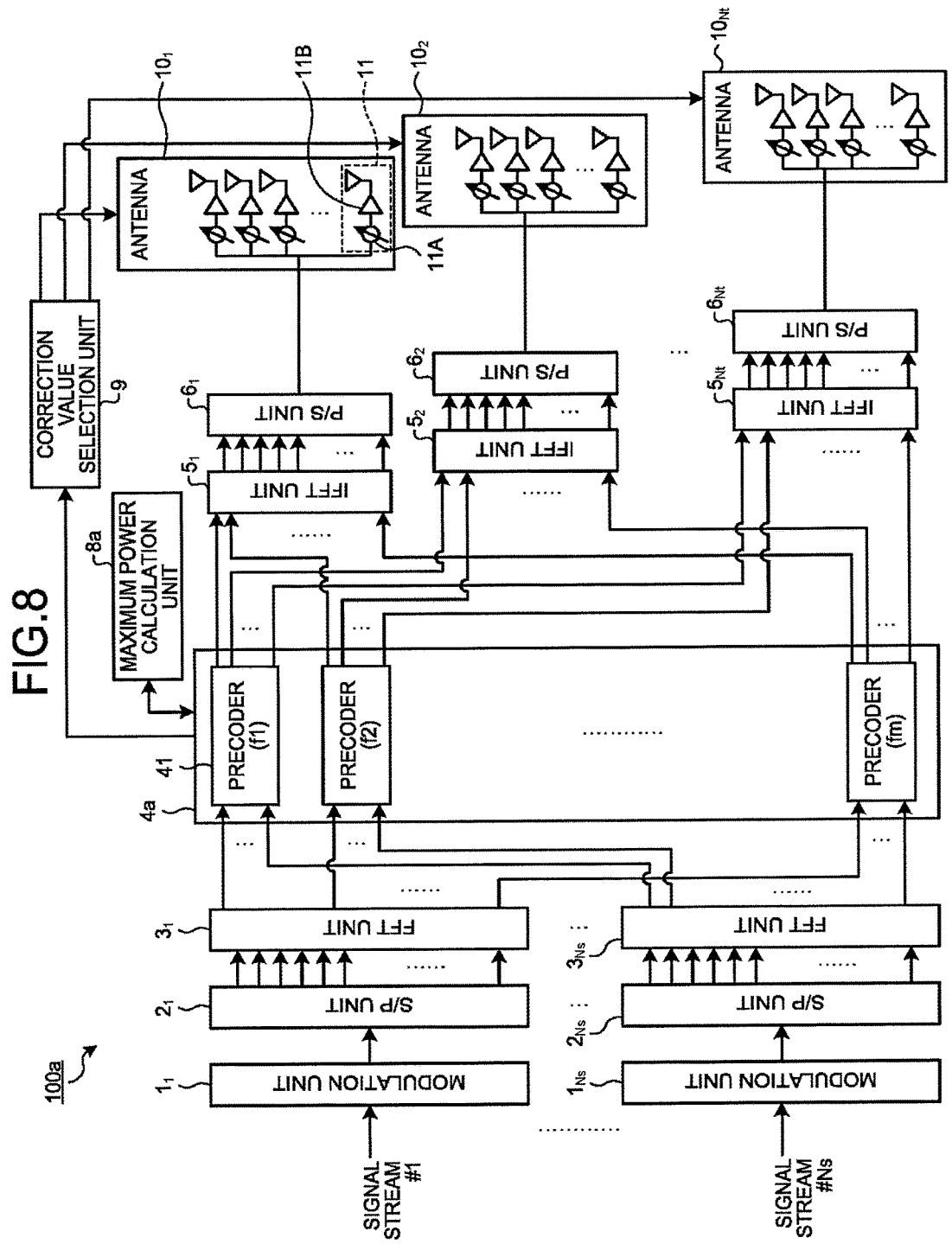
FIG. 8 is a diagram illustrating a configuration example of the radio transmission apparatus according to the second embodiment.

FIG. 8 is a diagram illustrating a configuration example of the radio transmission apparatus according to the second embodiment. The radio transmission apparatus 100a of the present embodiment is obtained by eliminating the multipliers $7_1$ to $7_{Nt}$ from the radio transmission apparatus 100 of the first embodiment and replacing the precoder unit 4 and the maximum power calculation unit 8 with a precoder unit 4a and a maximum power calculation unit 8a. The constituent elements other than the precoder unit 4a and the maximum power calculation unit 8a are equivalent to those of the radio transmission apparatus 100 of the first embodiment, and thus the description thereof will be omitted.

The maximum power calculation unit ea of the radio transmission apparatus 100a calculates the above-described power correction value β by a procedure equivalent to that of e maximum power calculation unit 8 described in the first embodiment. Furthermore, when calculating the power correction value β, the maximum power calculation unit 8a outputs the value to the precoder unit 4a.

As with the precoder unit 4 of the radio transmission apparatus 100 according to the first embodiment, the precoder unit 4a calculates a transmission weight of each antenna for each signal stream. At this time, the radio transmission apparatus 100a cooperates with the maximum power calculation unit 9a to obtain a transmission weight such that the power of the input signal for each antenna becomes equal to or less than the maximum power threshold Th. The maximum power threshold Th mentioned herein is equal to the maximum power threshold Th described in the first embodiment.

Figure 9:
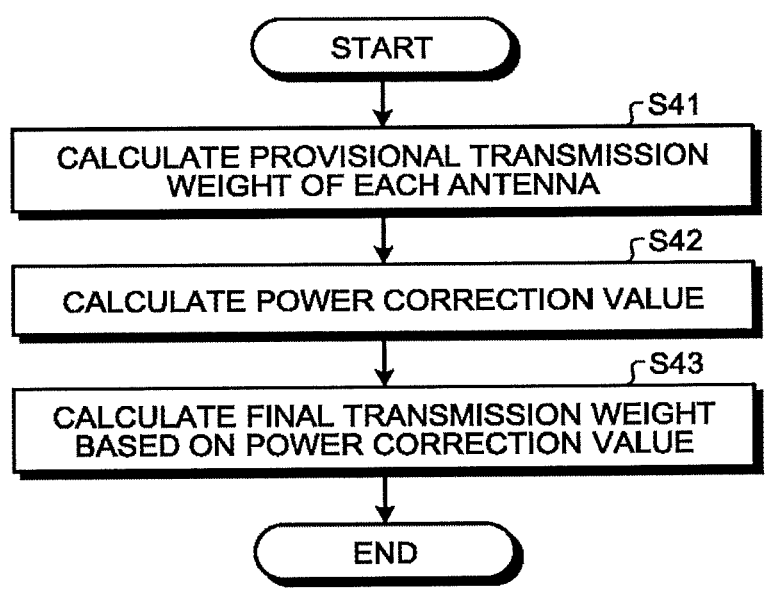
FIG. 9 is a flowchart illustrating an example of an operation of calculating a transmission weight, performed by the precoder unit and the maximum power calculation unit of the second embodiment being cooperated with each other.

FIG. 9 is a flowchart illustrating an example of an operation of calculating a transmission weight performed by the precoder unit 4a and the maximum power calculation unit 8a in cooperation with each other. In the calculation of the transmission weight performed by the precoder unit 4a and the maximum power calculation unit 8a in cooperation with each other, the precoder unit 4a first calculates a transmission weight of each antenna using the BD method or the like as with the precoder unit 4 of the radio transmission apparatus 100 of the first embodiment (Step S41). This transmission weight is called a provisional transmission weight that is a first transmission weight. Also in a case of calculating a transmission weight in a method other than the BD method, a transmission weight is calculated such that the eigenmode transmission is achieved. Next, the maximum bower calculation unit 8a calculates the power correction value β based on the provisional transmission weight and the maximum power threshold Th, and outputs the value to the precoder unit 4a (Step S42). The average power value for each antenna calculated based on the provisional transmission weight when the maximum power calculation unit 8a calculates the power correction value is an average power value of weighted signals (average power value for each antenna) obtained when the signals inputted from FFT units $3_1$ to $3_N$, to the precoder unit 4a are weighted with the provisional transmission weight.

When the power correction value β is inputted, the precoder unit 4a uses this value to calculate a final transmission weight that is a second transmission weight, that is, a transmission weight to be used in a weighting process of a transmission signal (Step S43).

In Step S43, the precoder unit 4a calculates the final transmission weight of each antenna so as to satisfy a condition represented by the following formula (4). In the formula (4), bold $w_{k,f}$ with '~' added thereto is the final transmission weight. In the formula (4), f denotes a frequency bin number, m denotes an antenna number, and k denotes a user number. $Q_{f,m}$ is an average power value before correction of a signal of the frequency bin f to be inputted to an antenna m, and $M_{max}$ is an antenna number of an antenna having the highest average power value of the input signal thereof. $Q_f$ with '~' added thereto is an average power value after correction of the signal of the frequency bin f with the power correction value β. The average power value before the correction means an average power value of the weighted signal obtained when weighting is performed with the provisional transmission weight. $u_j$ is a weighting coefficient for a j-th basis vector of the provisional transmission weight calculated in Step S41, and Nr is the number of multiplexed streams per user. When the number of transmission antennas is larger than the number of spatially multiplexed objects, the number of basis vectors is larger than Nr.

[Formula 4]

$$Q_{f,m} = \sum_{k=1}^{Nr} |w_{k,f}^m|^2, \tilde{Q}_f = \beta \cdot Q_{f,Mmax} \quad (4)$$

$$\tilde{w}_{k,f} = \sum_{j=1}^{Nr} u_j w_{k,f}, \text{ provided that } \left( \sum_{k=1}^{Nr} |\tilde{w}_{k,f}^n|^2 \leq \tilde{Q}_f \right)_{\forall n}$$

When the final transmission weight of each antenna is calculated in the precoder unit 4a, a precoder 41 multiplies a signal of each frequency bin by the final transmission weight, thereby weighting the transmission signal.

In the present embodiment, the maximum power calculation unit 8a calculates the power correction value β, but the power correction value β may be calculated by the precoder unit 4a.

A correction value selection unit 9 which calculates an average power value $P_m$ for each antenna based on the transmission weight calculated by the precoder unit 4a calculates the average power value $P_m$ using the above-mentioned final transmission weight calculated by the precoder unit 4a.

As described above, the radio transmission apparatus 100a of the present embodiment is configured to determine a transmission weight of each antenna such that power of an input signal for each antenna becomes equal to or less than a prescribed threshold. Specifically, first, a transmission weight with which eigenmode transmission is achieved is calculated and set as a provisional transmission weight, a power correction value is calculated based on an average power value of an input signal for each antenna which can be calculated from the provisional transmission weight and a threshold determined in advance, and a final transmission weight is calculated in consideration of the power correction value. by doing so, a maximum power value can be limited without disturbing orthogonality among the users, and an influence on a transmission signal, that is, an influence of an HPA that is a nonlinear amplifier and a calibration error can be minimized.

A hardware configuration for realizing the radio transmission apparatus 100a is equivalent to that of the radio transmission apparatus 100 according to the first embodiment.

The configuration described in the embodiments above indicates one example of the content of the present invention and can be combined with other publicly known techniques, and a part thereof can be omitted or modified without departing from the gist of the present invention.

REFERENCE SIGNS LIST $1_1$ to $1_{Ns}$ modulation unit; $2_1$ to $2_{Ns}$ serial-to-parallel conversion unit (S/P unit); $3_1$ to $3_N$, FFT unit; 4, 4a precoder unit; $5_1$ to $5_{Nt}$ IFFT unit; $6_1$ to $6_{Nt}$ parallel-to-serial conversion unit (P/S unit); $7_1$ to $7_{Nt}$ multiplier; 8, 8a maximum power calculation unit; 9 correction value selection unit; $10_1$ to $10_{Nt}$ antenna; 11 array element; 11A phase shifter; 11B HPA (High Power Amplifier); 41 precoder; 100, 100a radio transmission apparatus; 101 processor; 102 memory; 110 processing circuit.

The invention claimed is:

1. A radio transmission apparatus comprising:
a plurality of antennas each having an amplifier;
a transmission signal generation unit to generate a signal to be transmitted to a terminal via the antennas; and
a weighting processing unit to execute a weighting process on a signal to be transmitted to the terminal, which has been generated by the transmission signal generation unit, based on channel state information between the radio transmission apparatus and the terminal and an output limit value of the amplifier,
wherein the weighting processing unit comprises:
a precoder unit to generate a transmission weight for weighting a signal to be transmitted to the terminal based on the channel state information, and multiply the signal to be transmitted to the terminal by the generated transmission weight to perform weighting; and a power correction unit to correct power of a signal weighted by the precoder unit based on the transmission weight generated by the precoder unit and a threshold determined in advance based on the output limit value of the amplifier.

2. The radio transmission apparatus according to claim 1, wherein the power correction unit comprises:
   a correction value calculation unit to calculate an average power value of a signal outputted from the precoder unit based on the transmission weight, and calculate a power correction value for correcting power of the signal weighted by the precoder unit based on the calculated average power value and the threshold; and
   a multiplier to multiply the signal weighted by the precoder unit by the power correction value.

3. The radio transmission apparatus according to claim 1, comprising a correction value selection unit to select a correction value for correcting an amplitude and a phase of a signal inputted to the plurality of antennas for each of the antennas from among a plurality of correction values determined in advance, based on the transmission weight,
   wherein the antennas correct the amplitude and the phase of the inputted signal by using the correction value selected by the correction value selection unit.

4. The radio transmission apparatus according to claim 3, wherein the correction value selection unit calculates an average power value of a signal outputted from the precoder unit for each of the antennas to which the signal is inputted based on the transmission weight, and selects the correction value for each of the antennas based on the calculated average power value.

5. A radio transmission apparatus comprising:
   a plurality of antennas each having an amplifier;
   a transmission signal generation unit to generate a signal to be transmitted to a terminal via the antennas; and
   a weighting processing unit to execute a weighting process on a signal to be transmitted to the terminal, which has been generated by the transmission signal generation unit, based on channel state information between the radio transmission apparatus and the terminal and an output limit value of the amplifier,
   wherein the weighting processing unit comprises:
   a precoder unit to generate a transmission weight for weighting a signal to be transmitted to the terminal based on the channel state information, and multiply the signal to be transmitted to the terminal by the generated transmission weight; and
   a maximum power calculation unit to calculate a power correction value to be used when the precoder unit generates the transmission weight,
   the number of the antennas is equal to or larger than the number of signal streams to be spatially multiplexed,
   the precoder unit calculates a first transmission weight for achieving eigenmode transmission, and calculates a second transmission weight by which a signal to be transmitted to the terminal is multiplied, based on the first transmission weight and the power correction value calculated by the maximum power calculation unit, and
   the maximum power calculation unit calculates, based on the first transmission weight, an average power value of a weighted signal obtained when a signal to be transmitted to the terminal is weighted with the first transmission weight, and calculates the power correction value based on the calculated average power value and a threshold determined in advance based on an output limit value of the amplifier.

6. The radio transmission apparatus according to claim 5, wherein the precoder unit calculates an average power value of a weighted signal obtained when a signal to be transmitted to the terminal is weighted with the first transmission weight, for each antenna to which the signal to be transmitted to the terminal is inputted, generates a power upper limit value by correcting a maximum value of the calculated average power value using the power correction value, and generates the second transmission weight by linearly combining basis vectors of the first transmission weight so that an average power value of a weighted signal obtained when the signal to be transmitted to the terminal is weighted with the second transmission weight is equal to or less than the power upper limit value.

7. The radio transmission apparatus according to claim 5, comprising a correction value selection unit to select a correction value for correcting an amplitude and a phase of a signal inputted to the plurality of antennas for each of the antennas from correction values determined in advance, based on the second transmission weight,
   wherein the antennas correct the amplitude and the phase of the inputted signal by using the correction value selected by the correction value selection unit.

8. The radio transmission apparatus according to claim 7, wherein the correction value selection unit calculates an average power value of a signal outputted from the precoder unit for each of the antennas to which the signal is inputted, based on the second transmission weight, and selects the correction value for each of the antennas based on the calculated average power value.

* * * * *